United States Patent

Suzuki et al.

[11] 4,060,695
[45] Nov. 29, 1977

[54] SPEAKER IDENTIFICATION SYSTEM USING PEAK VALUE ENVELOP LINES OF VOCAL WAVEFORMS

[75] Inventors: Matsumi Suzuki; Hiroyuki Kataoka; Keiichi Ueno, all of Kanagawa, Japan

[73] Assignee: Fuji Xerox Co., Ltd., Tokyo, Japan

[21] Appl. No.: 713,065

[22] Filed: Aug. 9, 1976

[30] Foreign Application Priority Data

Aug. 9, 1975   Japan .................................. 50-97033

[51] Int. Cl.² .............................................. G10L 1/00
[52] U.S. Cl. ................................................. 179/1 SB
[58] Field of Search ................. 179/1 SB, 1 SC, 1 SD, 179/1 SA

[56] References Cited

U.S. PATENT DOCUMENTS 3,466,394  9/1969  French .............................. 179/1 SB
3,919,479  11/1975  Moon ................................ 179/1 SB

OTHER PUBLICATIONS

Flanagan, J., "Computers that Talk and Listen," IEEE Proc., vol. 64, No. 4, Apr. 1976.
Atal., B., "Automatic Speaker Recognition," Acoustic Soc. of AM Journal, vol. 45, 1969, p. 309.

Primary Examiner—Kathleen H. Claffy
Assistant Examiner—E. S. Kemeny
Attorney, Agent, or Firm—Sughrue, Rothwell, Mion, Zinn and Macpeak

[57] ABSTRACT

Voice verfication of individuals is carried out by utilizing the peak value envelope of voice signals. The voice signal is separated into its positive and negative polarity portions and stepped peak value envelope waveforms are developed from each portion. The latter waveforms are quantized and normalized; the latter being carried out to provide waveforms having a total area therebelow which equals a predetermined area. The quantized, normalized envelopes are then compared with recorded envelopes which were previously calculated in the same manner as the former envelopes. Comparison is carried out by calculating the Hamming distance between the new and stored envelopes.

3 Claims, 4 Drawing Figures

SPEAKER IDENTIFICATION SYSTEM USING PEAK VALUE ENVELOP LINES OF VOCAL WAVEFORMS

BACKGROUND OF THE INVENTION

This invention relates to a system for recognizing the identity of individuals by means of individual voices, and more particularly to a system for recognizing the identity of individuals by using the peak value envelop lines of vocal waveforms.

It is well known that a voice contains, in addition to a lingustic meaning, the information which is useful in recognizing or identifying the speaker. If voices can be utilized for proving identity of individuals, it will provide a more convenient technique than those which use such items or characteristics as, seals or stamps, signatures, photographs, finger prints, keys, secret codes or the like. In order to adopt voices as a practical means for verifying the identity of individuals, individual recognition systems which are reliable in recognition and identification ability have to be provided. At the present state of the art, the characterizing parameters which are used in the voice recognition of individuals are mainly obtained from frequency analysis and correlation analysis of voices.

It is known that the voice characteristics of an individual are contained in the peak value envelope of the voice signal. Use of the latter in a recognition system was reported in "The Journal of the Acoustical Society of America," Volume 45, 1969, page 309, item line 9.

SUMMARY OF THE INVENTION

According to the present invention, in view of the fact that the voice for collation is usually in the form of a sentence or words which contains in a mixed state the sentence information particular to the language spoken, accent information, dialect information, and vocal chord wave information and the like, it has been found that the peak value envelop lines of the vocal waveform contains a considerable amount of each of the latter mentioned information characteristics, and the recognition of individuals can be carried out reliably with use of only the peak value envelop line information. The instant invention is distinctively characterized by the following two points.
1. A voice in the form of a sentence or phrase containing sentence information, accent information, dialect information and vocal chord information is employed as a voice for collation. For Example, the collative voice is a sentence or language including a word which is accentuated differently in different districts like "(hashi)" or a word which is pronounched in different ways like "(shichi, sutsu, hichi)" or "(hyaku, shaku)."
2. Vocal waveforms obtained by pronouncing the sentence or language mentioned above are recorded faithfully in the form of electric signals to form peak value envelop lines as a characteristic pattern for each person. Although envelop lines of vocal waveforms have previously been used for voice recognition, it has been the conventional practice to use such envelop lines after they have been passed through a low-pass filter. In other words, the conventionally used envelop lines are in an integrated form of the original vocal waveforms, simply expressing the level of vocal energy in contrast to peak value envelop lines which contain sentence information, dialect information, accent information and vocal chord wave information.

DETAILED DESCRIPTION OF THE PREFERRED EMBODIMENT

Figure 1:
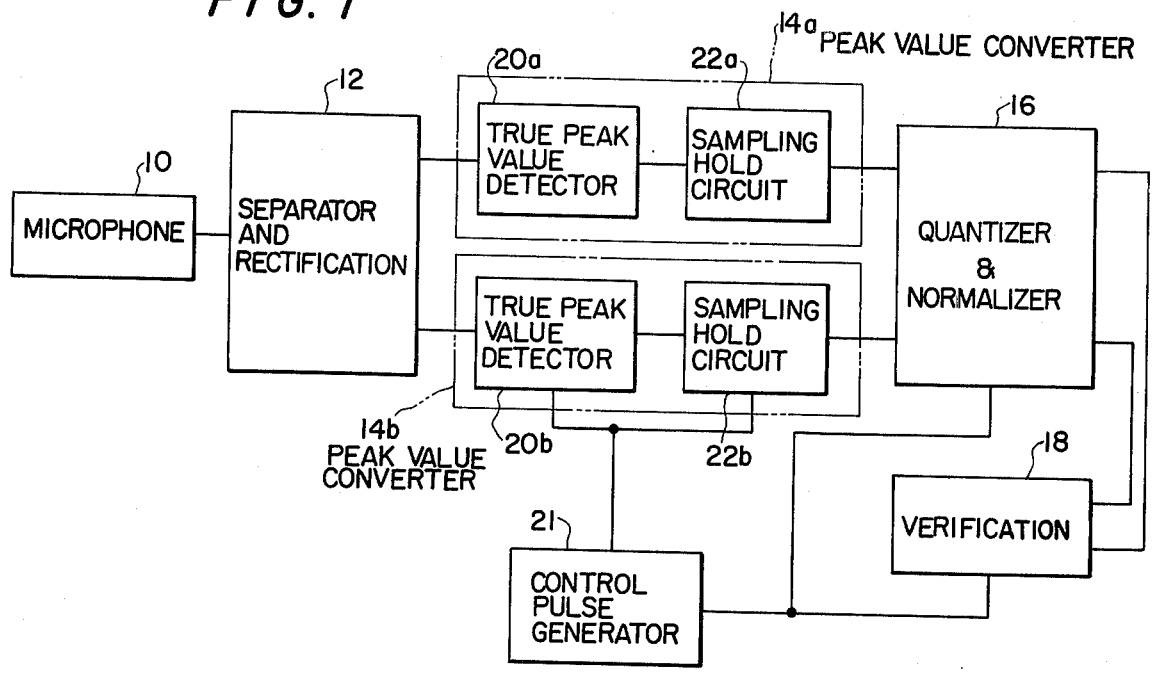
FIG. 1 is a block diagram employed to explain the system of the present invention.

An embodiment of the voice recognition is illustrated in block diagram form in FIG. 1 and comprises, a microphone 10 for converting a spoken group of words into an electrical voice signal (hereinafter referred to simply as a voice signal), a separation and rectifier circuit 12 for separating the positive and negative polarity portions of the voice signal and rectifying the negative polarity portion, peak envelope generators 14a and 14b for generating peak envelopes for the positive and negative portions of the voice signal, a quantizer and normalization circuit 16 for converting the peak envelope into a digital signal and normalizing same to have a predetermined area under the envelope curves, and a verification means 18 for comparing the quantized/normalized peak envelope signals with stored reference signals previously obtained by the same circuitry as shown in FIG. 1.

Figure 2:
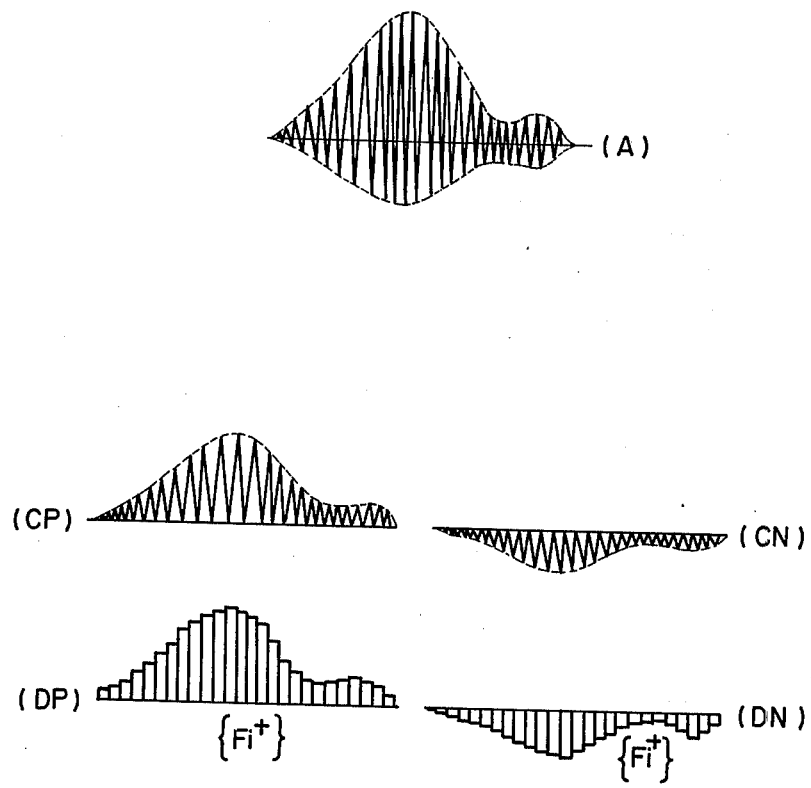
FIG. 2 is a diagram of waveforms.

The operation of the latter embodiment will be described with reference to the timing diagrams in FIG. 2 wherein waveform A represents the voice signal output of the microphone 10, waveforms CP and CN represent the positive and negative polarity portions as separated by the separation means 12, and waveforms DP and DN represent the envelope waveforms for the positive and negative portions at the output terminals from the peak envelope generaters 14a and 14b, respectively. It should be understood that the negative portions CN and DN are the same polarity as the positive portions following separation and rectification. However for the sake of clarity in distinguishing the two portions they are shown and referred to as positive and negative portions, respectively.

The signal A appearing at the output of the microphone 10 is applied to the separator and rectification circuit where it is rectified to separate the positive polarity portion CP from the negative polarity portion CN. The negative polarity portion is reversed in polarity and applied to the peak envelope generator 14b while the positive polarity portion is applied to the peak envelope generator 14a.

Each of the generators 14a and 14b operates to detect the peaks occurring during a sample period to thereby provide a stepped envelope signal DP and DN respectively. Each peak or step is designated $F_i^+$ or $F_i^-$, where: $i$ is the sample period during which the peak is detected and the sample periods are 1, 2, 3 ... $n$; and (+) and (−) designate the positive and negative polarity parts, respectively. Each envelope generator comprises a true peak value detector 20a, 20b and a sampling hold circuit 22a, 22b. The detector 20a, 20b follows the peak of the input signal thereto. At a sample time controlled by a control pulse generator 24, the peak value is transferred to the sampling hold circuit 22a, 22b and at the same time the detector 20a, 20b cleared or reset to enable it to detect the next peak. The sampling period, defined by the pulse repetition period of the sampling pulses is selected to enable to detectors 22a, 22b to detect the peaks of each cycle of the voice signal. The optinum sampling period is about 10 m sec.

Figure 3:
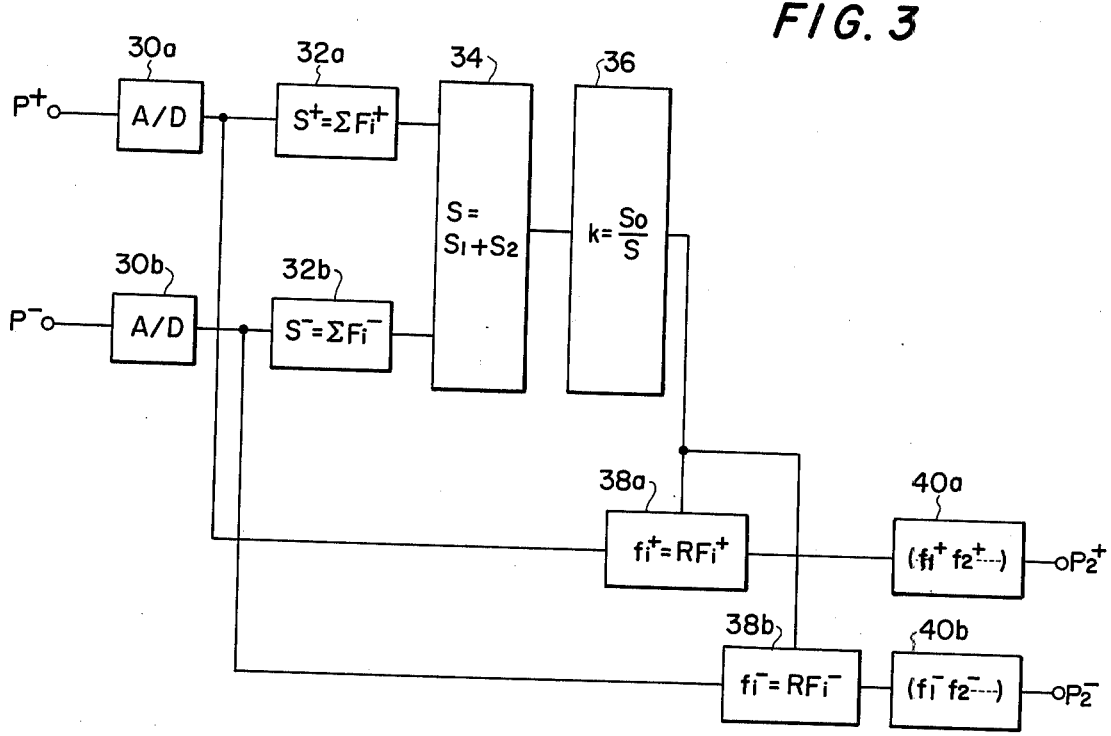
FIG. 3 is a block diagram of a quantizing and normalizing means used in FIG. 1.

The stepped envelope signals DP and DN (referred to hereafter as P+ and P−) are applied to the quantizer and normalizer 16, a detailed example of which is shown in FIG. 3. The quantizer and normalizer comprises analog-to-digital converters 30a and 30b, summation circuits 32a, 32b, and 34, coefficient determining circuit 36, coefficient multipliers 38a and 38b, and registers 40a and 40b. The circuit of FIG. 3 operates to quantize each step Fi of the envelope into a digital value and to multiply each step Fi by a coefficient K selected to make the total area under the two envelope curves equal to a predetermined value S. It will be appreciated by anyone of ordinary skill in the art that the quantizing and normalization functions could be separated and could also be carried out at different points in the system. For example the normalization may be carried out prior to digital conversion, and even prior to envelope generation.

Referring back to FIG. 3, the stepped envelopes P+ P− are converted into digital envelopes by converting each step Fi+ and Fi−. The required timing signals for digital conversion and for all the conventional functions requiring precise timing control are provided by the control pulse generator 24 (FIG. 1).

The digitally converted steps Fi+ and Fi− are normalized to the digitably converted and normalized steps fi+ and fi−, by multiplying the former by a digital coefficient K, determined in a manner to be described later, in digital multipliers 38a and 38b. The outputs therefrom are stored in registers 40a and 40b, respectively. When the system is operated to determine a standard pattern for a particular person, the data in registers 40a and 40b is entered into a selected address of a memory system by a conventional memory input control system (not shown). When the data is derived for purposes of verification, the data in registers 40a, 40b is applied to the verification means 18 (FIG. 1) for comparison with the standard pattern. It will be noted that the standard pattern for the person to be verified is extracted from the memory by a conventional memory control system in response to the person or another operator Keying in a code which is preferrably known only to the person whose voice resulted in the standard pattern.

The coefficient K is calculated by obtaining the area under each envelope P+ and P−, summing the respective areas, and dividing a reference total area $_o$ by the calculated area.

The respective envelope areas S+ and S− are calculated in summation circuits 32a and 32b which calculates $$S^+ = \sum_{i=1}^{n} Fi^+ \text{ and } S^- = \sum_{i=1}^{n} Fi^-,$$

respectively. The total area S is obtained in summation circuit 34. The coefficient K is obtained in the coefficient determining circuit 36, which may be a divides circuit, by dividing a reference area $S_o$ by the calculated total area. It will be appreciated that the signals applied from the converters 30a and 30b to the multipliers 38a and 38b, respectively, are delayed sufficiently to permit calculation of the coefficient K.

Figure 4:
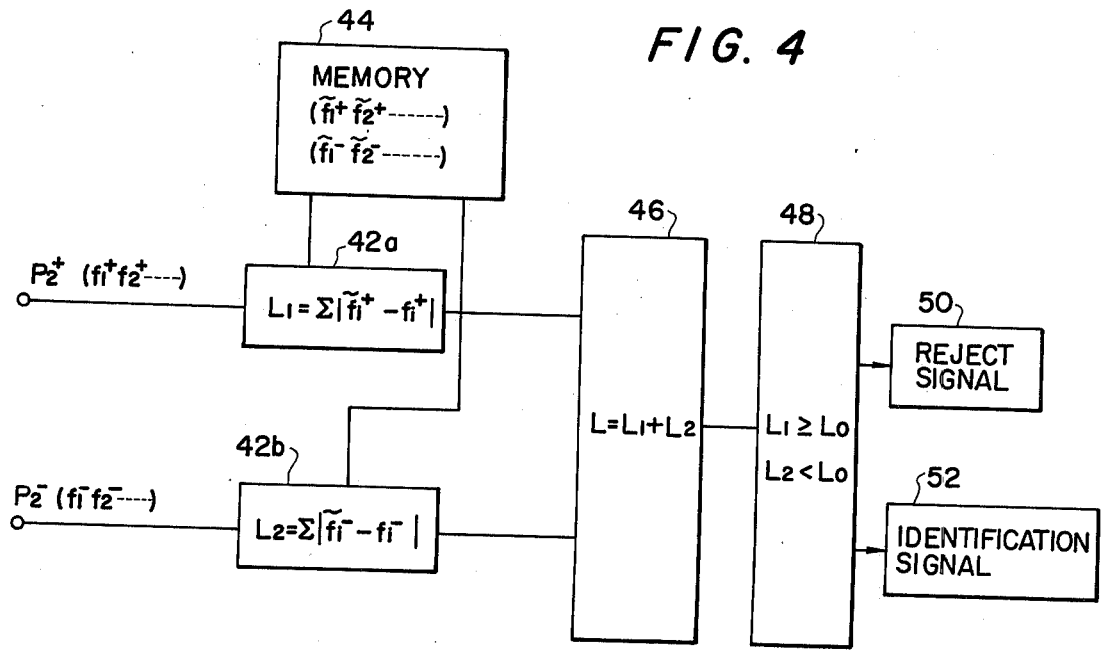
FIG. 4 is a block diagram of a verification means used in FIG. 1.

An example of the verification means 18 is shown in FIG. 4. In FIG. 4, comparison between the input pattern P and the standard pattern $\bar{P}$ is carried out by calculating the Hamming distance between the two patterns. The Hamming distance is.

$$L = L_1 + L_2 = \sum_{i=1}^{n} |\bar{fi}^+ - fi^+| + \sum_{i=1}^{n} |\bar{fi}^- - fi^-|$$

Inputs P+ and P− from the registers 40a and 40b (FIG. 3) are applied to calculation circuits 42a and 42b along with the standard pattern $\bar{P}$ ($\bar{P}$+ and $\bar{P}$−) extracted from the memory 44. The calculator performs substraction between the corresponding digitally normalized steps $\bar{fi}$ and $fi$ and sums the absolute values of the differences. The respective Hamming distances $L_1$ and $L_2$ calculated by 42a and 42b are totalled in summation means 46 to obtain a total Hamming distance L. The Hamming distance L is compared in calculator 48 by comparing it to a threshold distance $L_o$. If the calculated difference L is equal to or greater than $L_o$, a reject signal 50 is provided to indicate that the person requesting verification is not the same as the person who recorded the standard pattern. If L is below $L_o$, an identification signal 52 is provided.

It will be understand the individual threshold levels $L_o$ may be provided for each standard pattern and can be along with the standard pattern in the memory. The threshold level can easily be decided upon experimentally by making numerous verifications of several people, using standard patterns of the people previously recorded, noting the value L calculated in each case, and selecting the value L for each person which will minimize rejects and maximize positive identifications.

While the invention has been described in detail and with reference to specific embodiments thereof, it will be apparent to one skilled in the art that various changes and modifications can be made therein without departing from the spirit and scope thereof.

What is claimed is:

1. A voice recognition system for developing from an electrical voice signal a characteristic pattern for comparison with a stored characteristic pattern, said system comprising, means for separating said voice signal into its positive and negative polarity portions, peak follower circuit means for following the peaks of said positive and negative polarity portions, sampling means connected to said peak follower circuit means for sampling said peaks at predetermined intervals to develope positive and negative peak envelope waves, and quantizing and normalizing said positive and negative peak envelope waves, said quantized normalized positive and negative peak envelopes constituting said characteristic pattern.

2. A voice recognition system as claimed in claim 1 wherein said quantizing and normalizing means comprises, digital conversion means for converting each peak level of said positive and negative envelope waveforms into a respective digital peak level signal, and means for multiplying each said digital peak level signal by a coefficient K, where K is selected to make the total area under the positive and negative envelope waveforms equal to a predetermined value following multiplication.

3. A voice recognition system as claimed in claim 2 further comprising means for calculating the Hamming distance between said characteristic pattern and said stored characteristic pattern.

* * * * *